(12) United States Patent
Pastula et al.

(10) Patent No.: US 6,749,958 B2
(45) Date of Patent: Jun. 15, 2004

(54) INTEGRATED MODULE FOR SOLID OXIDE FUEL CELL SYSTEMS

(75) Inventors: Michael Pastula, Calgary (CA); Arpad Horvath, Calgary (CA); Martin Perry, Calgary (CA); Dennis Prediger, Calgary (CA)

(73) Assignee: Global Thermmelectric Inc., Calgary (CA)

( * ) Notice: Subject to any disclaimer, the term of this patent is extended or adjusted under 35 U.S.C. 154(b) by 193 days.

(21) Appl. No.: 09/682,019

(22) Filed: Jul. 10, 2001

(65) Prior Publication Data

US 2002/0004154 A1 Jan. 10, 2002

(30) Foreign Application Priority Data

Jul. 10, 2000 (CA) .............................................. 2313498

(51) Int. Cl.[7] .............................. H01M 8/06; H01M 8/12
(52) U.S. Cl. .............................. 429/26; 429/17; 429/19; 429/20; 429/30
(58) Field of Search .............................. 429/30, 17, 19, 429/20, 26

(56) References Cited

U.S. PATENT DOCUMENTS 3,718,506 A * 2/1973 Fischer et al. ................ 429/24
5,840,437 A * 11/1998 Diethelm .................... 429/14
6,048,508 A 4/2000 Dummerssdorf et al.
6,077,620 A 6/2000 Pettit

FOREIGN PATENT DOCUMENTS

| CA | 1217504 | 2/1987 |
|----|---------|--------|
| CA | 1309128 | 10/1992 |
| CA | 2299695 | 3/1999 |
| CA | 2240298 | 5/1999 |
| CA | 2103939 | 4/2000 |
| EP | 0 948 070 A1 | 11/1999 |
| WO | WO 95/10126 | 4/1995 |
| WO | WO 99/13521 | 3/1999 |

OTHER PUBLICATIONS

Achenbach, et al. "Gas Procesing of SOFC Plants" First European Solid Oxide Fuel Cell Forum Proceedings, vol. 1, 1994, pp. 153–162, no month.

* cited by examiner

Primary Examiner—Susy Tsang-Foster
(74) Attorney, Agent, or Firm—Bennett Jones LLP

(57) ABSTRACT

An integrated module includes an afterburner, heat exchanger and fuel processor. The module is thermally integrated solid oxide fuel cell.

11 Claims, 7 Drawing Sheets

INTEGRATED MODULE FOR SOLID OXIDE FUEL CELL SYSTEMS

BACKGROUND OF INVENTION

The present invention relates to an integrated module for solid oxide fuel cell ("SOFC") systems comprising an afterburner, a heat exchanger and a fuel processor.

As many remote power customers use natural gas or propane, these are obvious choices for SOFC fuel in remote power generation systems. As well, many other applications exist for fuel cell systems such as residential cogeneration and automotive uses. SOFCs have the advantage of easily being able to use hydrocarbon fuels through fuel processing methods including steam reforming, partial oxidation and autothermal reforming. As fuel processing of hydrocarbons occurs at or near SOFC operating temperatures, thermal integration of both the fuel processor and stack is desired.

Steam reforming is a method that realizes a high overall system efficiency and provides the stack with a hydrogen-rich fuel. Therefore, it is desirable to provide a SOFC system that uses steam reforming of a hydrocarbon fuel.

It would be advantageous if a module for use with a SOFC system would effectively: 1) completely oxidize the fuel remaining in the SOFC stack anode exhaust gas using the stack cathode exhaust gas or other air, and 2) directly utilizes the heat produced by oxidation of the anode exhaust gases to preheat and prereform all or a desired portion all of the hydrocarbon/water fuel mixture being fed to the SOFC stack, using a suitable catalyst, and 3) directly heat the incoming (to SOFC stack) cathode air.

SUMMARY OF INVENTION

An integrated module for use in a solid oxide fuel cell ("SOFC") system is disclosed which combines several functions into one unit. In one embodiment, the integrated module oxidizes the fuel cell stack anode exhaust using the stack cathode exhaust or other air, preheats and prereforms (processes a percentage of, or completely) the incoming hydrocarbon/water mixture using a suitable catalyst to provide a hydrogen and carbon monoxide rich stream for the fuel cell anode, and also further heats the air destined for the SOFC cathode.

In one aspect, the present invention comprises a SOFC system including a fuel cell having a fuel intake, an air intake, a cathode exhaust and an anode exhaust, and comprising an integrated module comprising an afterburner, a fuel processor and a heat exchanger, wherein: (a) said afterburner comprises an intake connected to the anode exhaust, or anode and cathode exhausts, and an igniter; (b) said heat exchanger comprises an intake connected to an air supply and an exhaust connected to the air intake of the SOFC wherein the heat exchanger is thermally coupled to the afterburner; and (c) said fuel processor comprises an intake connected to a fuel/water supply, a fuel reforming catalyst, and an exhaust connected to the fuel intake of the SOFC wherein the fuel processor is thermally coupled to the heat exchanger and/or the afterburner.

The afterburner burns the unused fuel in the SOFC stack exhaust. The heat produced by the afterburner is exchanged by the heat exchanger to preheat the air stream into the SOFC stack. The fuel/water stream is also preheated and prereformed in the fuel processor which also uses heat from the afterburner. The fuel processor comprises an effective catalyst so that steam reformation of the hydrocarbon fuel may take place as it passes through the fuel processor.

In one embodiment the afterburner is comprised of a tubular combustion chamber and an igniter. The combustion chamber is encircled by a high temperature heat air exchanger for transferring the combustion heat to the incoming air and fuel/water mixture. The heat exchanger is itself encircled by the fuel processor. Therefore, the integrated module may be comprised of a tubular core, a middle shell which contains the heat exchanger and an outer shell which contains the fuel processor.

DETAILED DESCRIPTION

The present invention provides for an integrated module for use within a SOFC. When describing the present invention, all terms not defined herein have their common art-recognized meanings.

Figure 1:
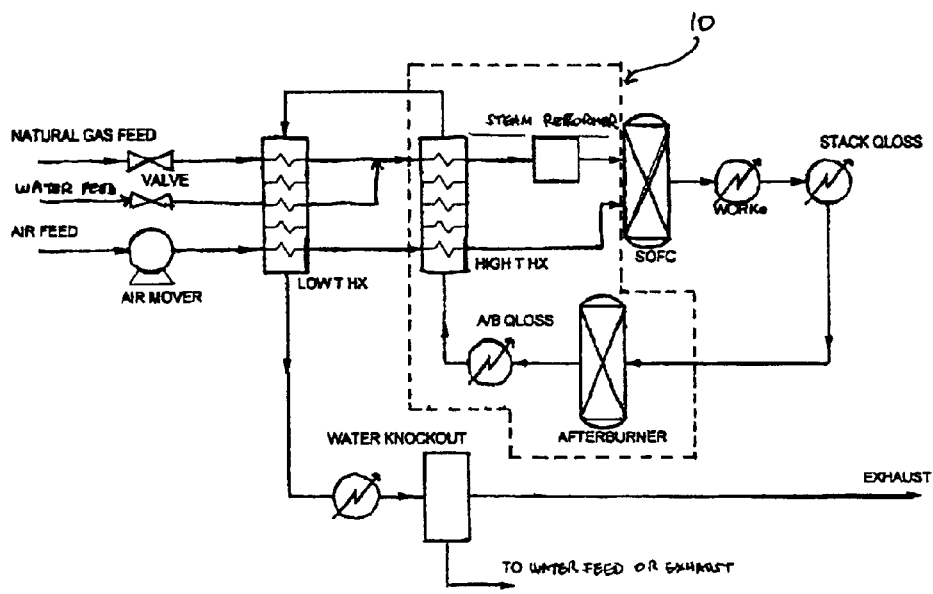
FIG. 1 is a schematic of a process of the present invention.
Figure 2:
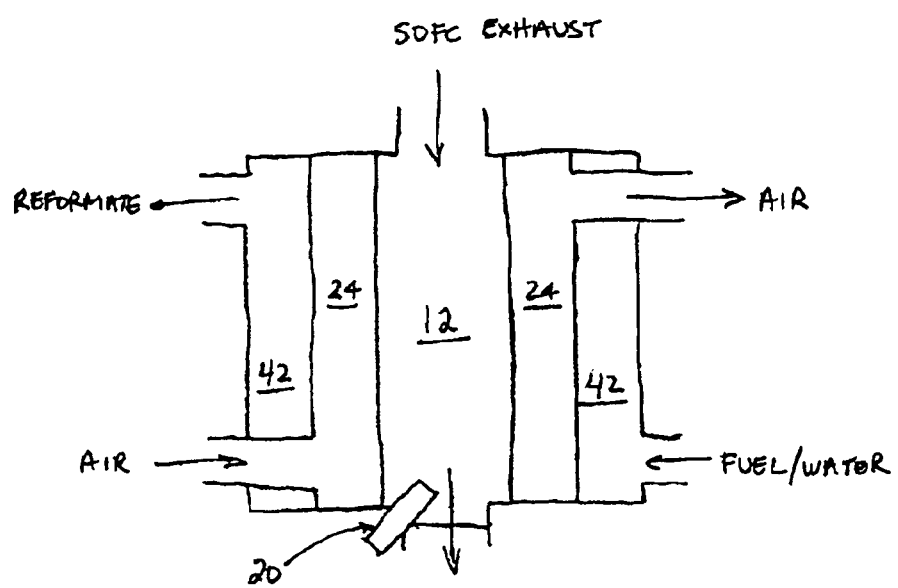
FIG. 2 is a schematic depiction of an apparatus of the present invention.

In one embodiment, the cathode and anode exhausts from the fuel cell stack passes through the centre of the module (10) in a generally tubular conduit (12), referred to herein as the afterburner. The anode exhaust is directed directly into the afterburner (12) through a burner assembly (14). The cathode exhaust enters through a port (17) and manifold (18) as shown in FIG. 1, and is directed into the afterburner (12) adjacent the burner (14). The anode exhaust contains unoxidized fuel species such as a hydrocarbon such as methane, carbon monoxide or hydrogen. The cathode exhaust is typically primarily air (oxygen depleted). It is preferred to use the cathode exhaust in the afterburner as that air stream is heated in the SOFC, however, it is not essential and a separate air source may be used, or none at all if the anode exhaust itself contains enough oxygen to permit complete combustion of the remaining fuel in the afterburner.

Figure 3:
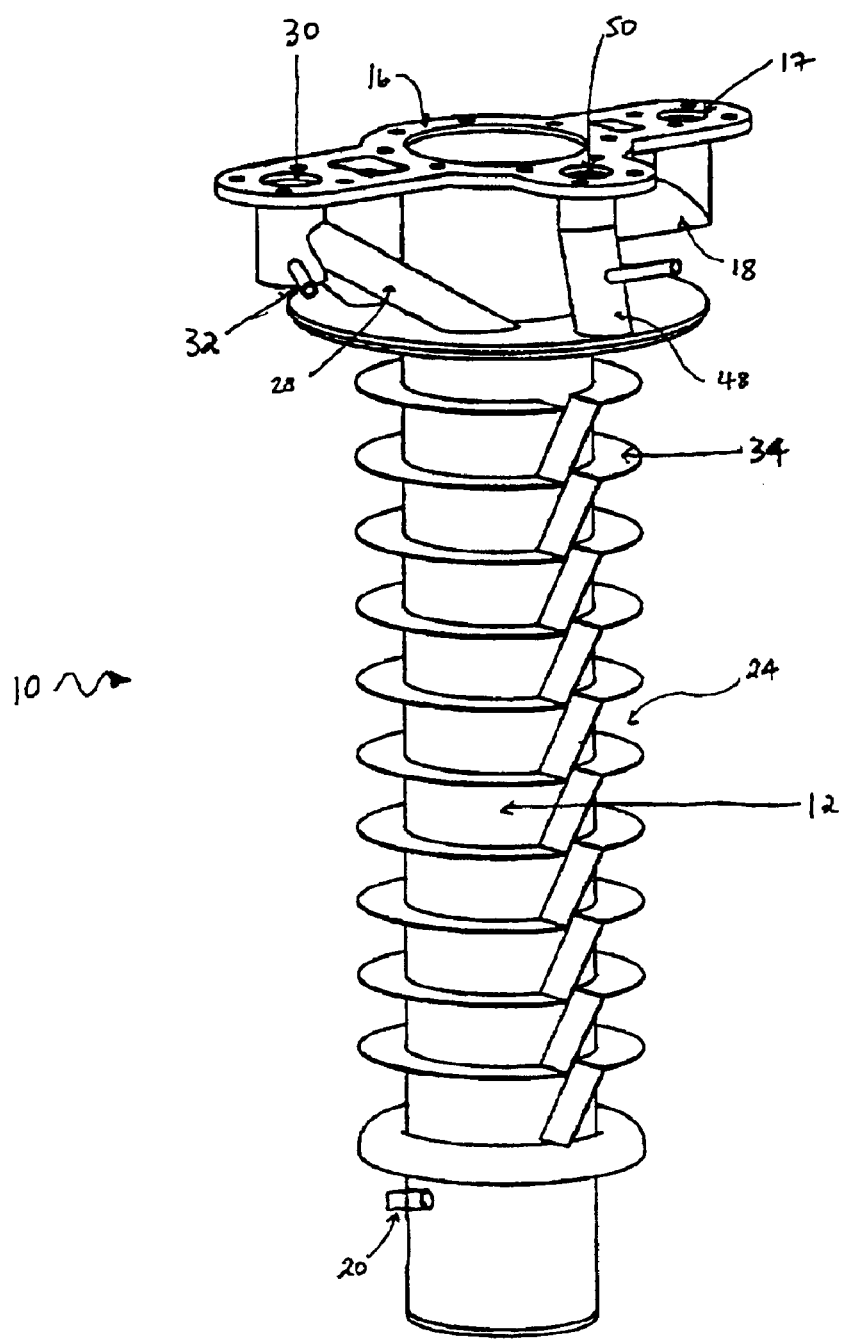
FIG. 3 is a view of the afterburner and heat exchanger.
Figure 3A:
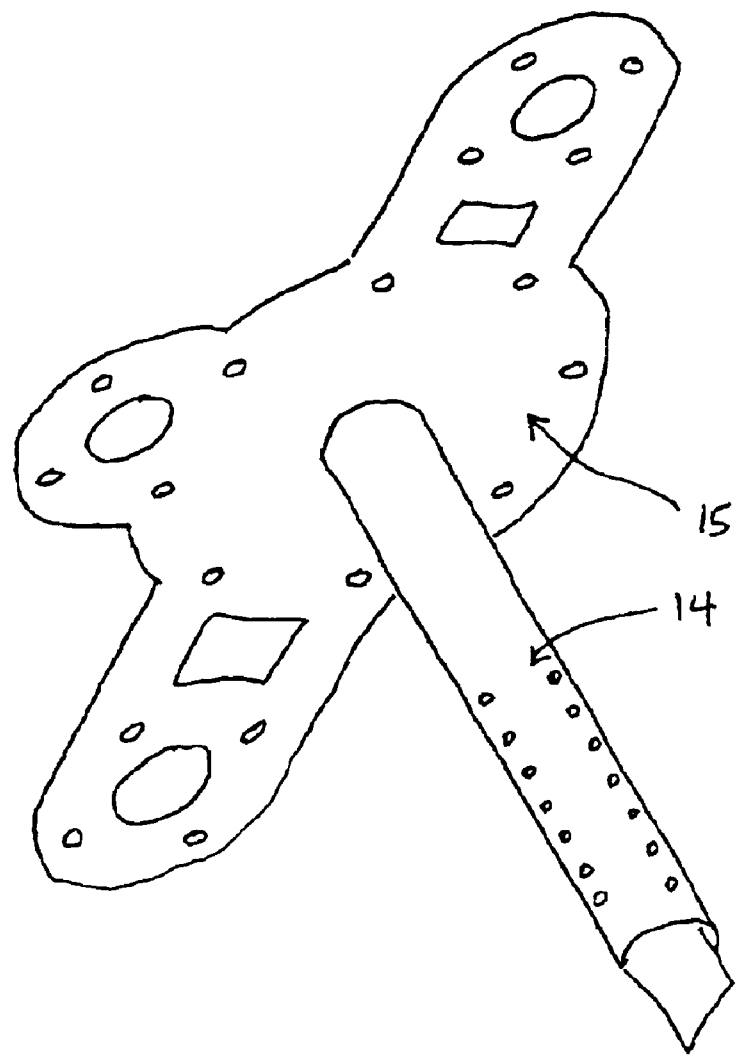
FIG. 3A is a view of a burner assembly.
Figure 4:
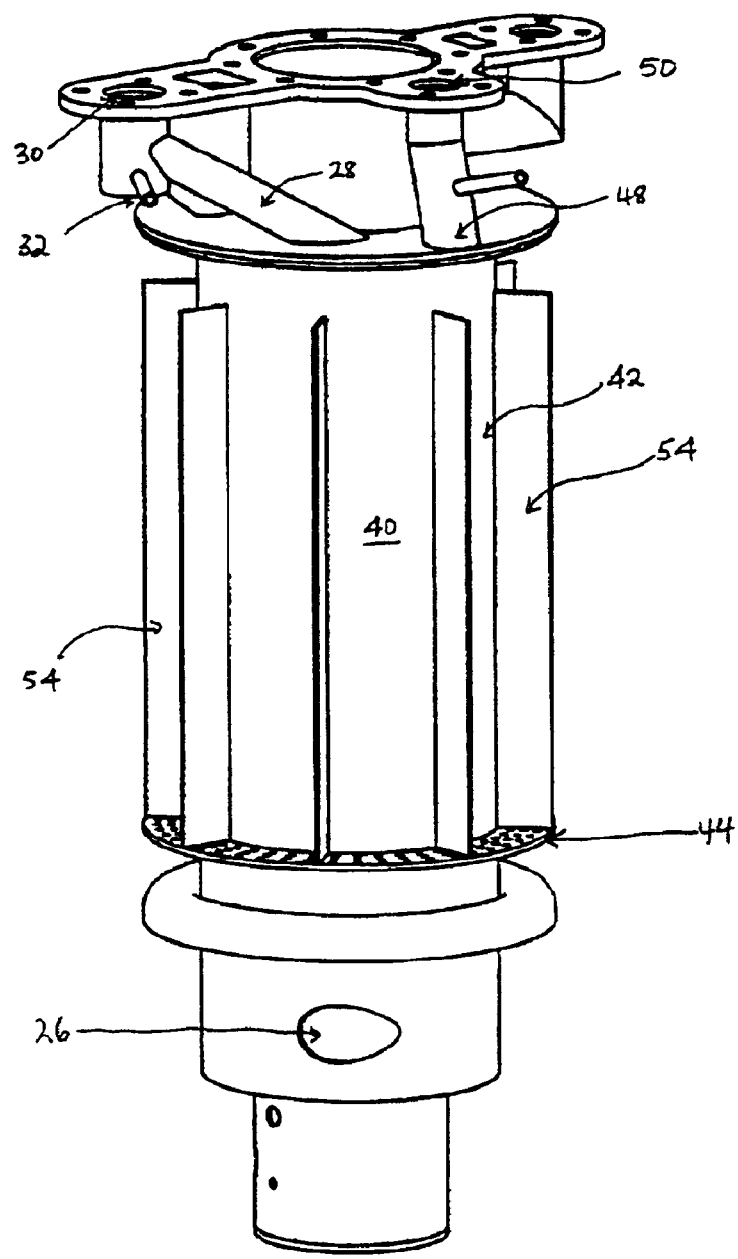
FIG. 4 is a view of the fuel processor.

The top end of the afterburner (12) includes a mounting flange (16) which defines openings for the afterburner intake, and heat exchanger exhaust and fuel processor (reformate) exhaust. As shown in FIG. 3A, the burner (14) is mounted to a similar flange (15) which allows insertion of the burner tube (14) into the afterburner (12).

An igniter (20) is inserted at the far end of the afterburner (12) which is used for igniting the afterburner (12) on cold system starts. The igniter (20) may be in operation only to initiate combustion, and then can be turned off. The igniter may be a pilot flame, an electronic spark device or other ignition means.

Figure 5:
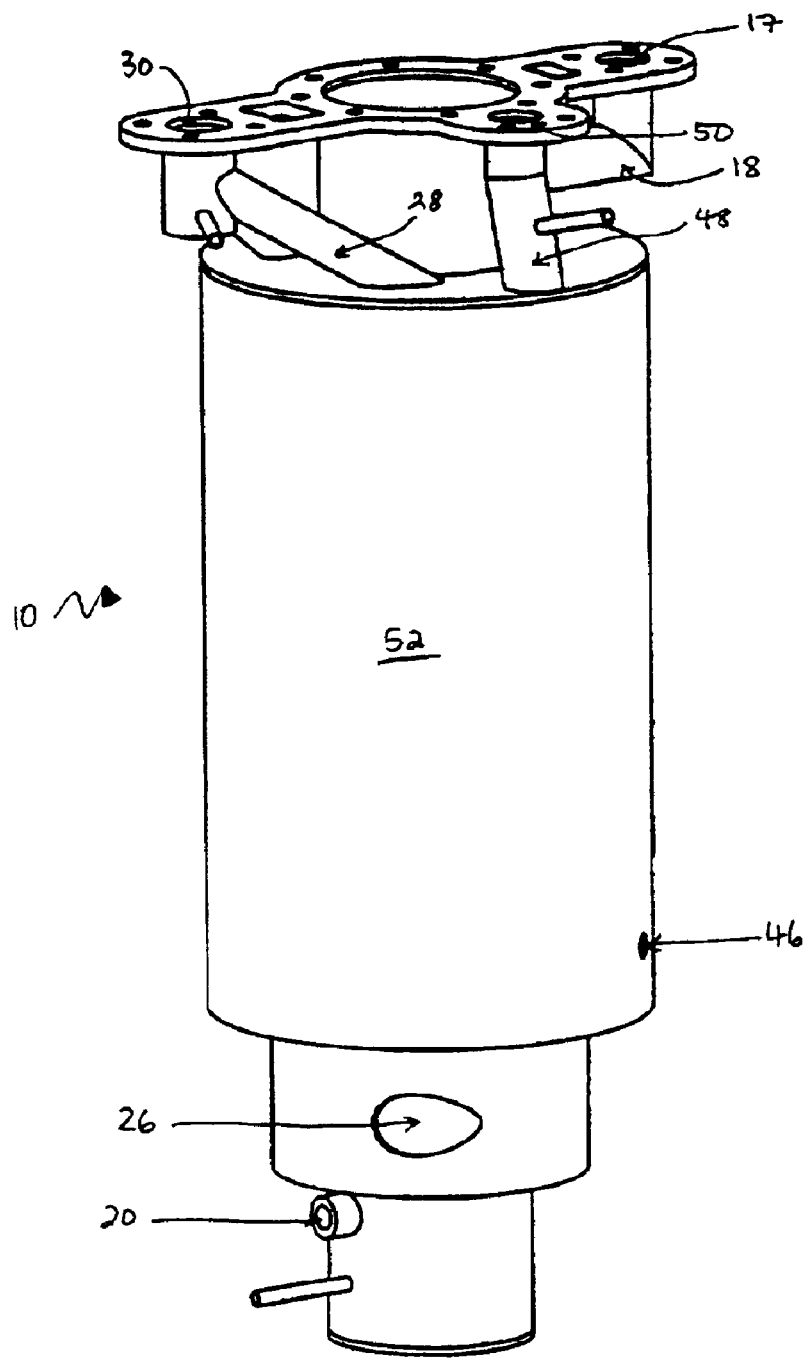
FIG. 5 is a view of the integrated module complete with an outer-shell.
Figure 6:
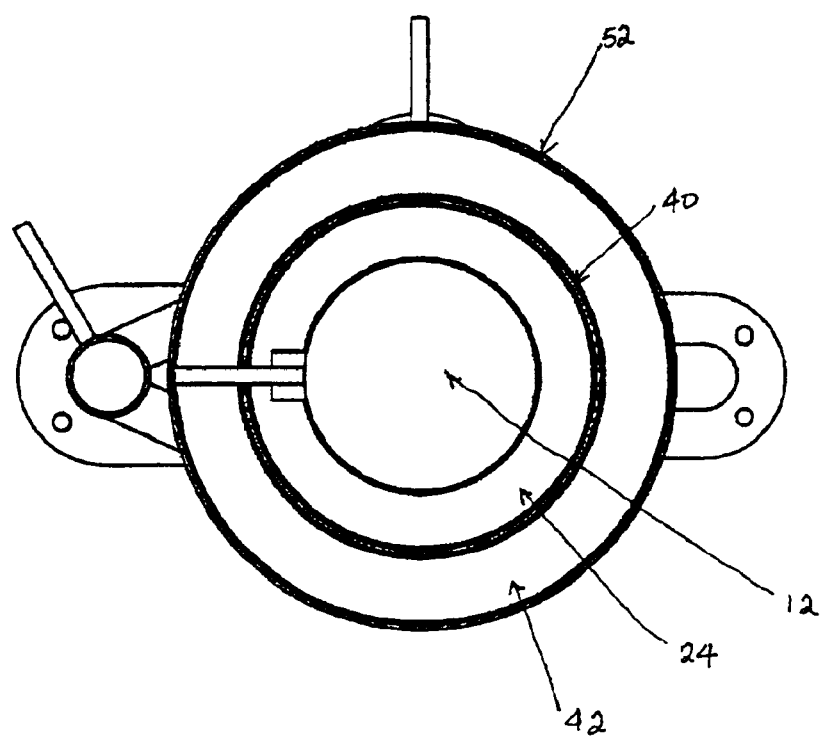
FIG. 6 is a bottom plan view of the apparatus.

In one embodiment, the fuel burner tube (14) is contained in the afterburner (12) to control mixing of anode and cathode exhausts as depicted in FIG. 5. Other combustion technologies such as sintered metal or porous ceramic nozzles, or other well known combustion/burner means can be utilized. Controlled mixing is required during normal operation as the afterburner operating temperatures may exceed the auto-ignition temperature of the fuel species present in the anode exhaust. The burner tube (14) contains small holes for the fuel gas mixture to escape and also acts as a burner flame support.

Surrounding the afterburner (12) are the heat receiving portions of the integrated module (10). In one embodiment, a high temperature air heat exchanger (24) encircles the afterburner (12) as is shown in FIG. 3. The heat exchanger (24) transfers heat energy from the afterburner (12) to the air stream destined for the cathode in the SOFC. Air enters the heat exchanger through a port (26) and exits through tubes (28) and port (30). A coupling (32) where a thermocouple or gas sampling means may be attached may be provided. In one embodiment, the interior of the heat exchanger (24) is baffled to route the air through a tortuous path, increasing the potential for heat transfer to the air. As shown in FIG. 3, the baffle (34) may take the form of a continuous spiral baffle which routes the air through the heat exchanger is a substantially helical fashion. As is apparent, the baffle also serves to conduct heat into the heat exchanger from the afterburner. The baffling may take any configuration which serves to route air through a tortuous path and to conduct heat.

The heat exchanger is contained within a middle shell (40) as shown in the Figures, which also serves as the inner wall of the fuel processor (42). The fuel processor (42) may also be referred to as a preformer. A hydrocarbon, preferably natural gas, is combined with water and is passed through the fuel processor (42) which includes a suitable steam reforming catalyst such as a nickel/alumina catalyst. Suitable catalysts for steam reformation of methane are well known in the art. The hydrocarbon and steam react in an endothermic reaction to produce hydrogen and carbon monoxide. The thermal energy released from the afterburner (12) is used to drive this endothermic reaction. In one embodiment, the catalyst is in pellet form contained within the fuel processor chamber (42) contained by a perforated baffle plate (44). The hydrocarbon/water feed enters through a port (46) and the reformate exits through tube (48) and port (50). The fuel processor (42) may also include a plurality of fuel processor fins (54) which radiate outwards from the shell (40) and which serve to contain the catalyst and to conduct heat into the fuel processor (42). The fuel processor is contained within an outer-shell (52) which is the outer shell for the module (10).

In the embodiment shown and described, the afterburner, heat exchanger and fuel processor are concentric cylinders. However, in alternative embodiments, the three elements may take different shapes or configurations. What is necessary is that the afterburner receive and burn fuel from the SOFC exhaust and provide heat to the heat exchanger and fuel processor.

The integrated module (10) may also function in conjunction with a low temperature heat exchanger (not shown) that preheats the incoming raw air and fuel/water mixture. The configuration of the low temperature heat exchanger and the integrated module is shown schematically in FIG. 1. The fuel oil water may be combined before entering heat exchanger or afterwards, before entering the fuel processor (42). The preheating of the air and fuel is preferably done in stages so as to avoid large thermal stresses upon the heat exchangers.

The integrated module is thermally integrated with the SOFC stack as is described herein and as will be apparent to one skilled in the art. The described integrated module (10) offers a unique functional thermal system during heatup, normal operation, and transients. During transients of the power load on the fuel cell stack, and changes in air and fuel flow rates, the integrated module (10) offers excellent response. For example, if the stack electrical load is decreased, the heat generated in the stack (the waste heat portion of the fuel cell reaction) also decreases. However, the afterburner (12) in the integrated module (10) responds automatically due to the change in incoming fuel composition, and increases in temperature. The increase in afterburner temperature increases the temperature of the air and fuel fed to the stack, thus maintaining a relatively constant stack temperature.

During startup, where both the SOFC stack and integrated module are cold, the fuel passes through the fuel processor (42) without being reformed and the SOFC without being oxidized. Accordingly, the afterburner receives substantially all of the fuel and thus operates at the upper end of its temperature range. As a result of the elevated afterburner temperature, the air feed to the SOFC stack heats rapidly and the fuel processor heats up as well. When the fuel processor reaches a temperature sufficient to support the endothermic steam reformation reaction, the hydrocarbon is converted to hydrogen and carbon monoxide. The hydrogen and carbon monoxide are fuel species utilizable in the SOFC. When the SOFC heats up to operating temperature, the amount of fuel which reaches the afterburner is reduced, reducing the temperature of the afterburner and therefore the temperature of the air and fuel being fed to the stack.

At any time when the stacks are not producing electrical power, such as during startup, the afterburner (12) is the sole or main source of heat to bring the fuel cell stack (and thus complete system due to its thermal integration) up to operating temperature. However, additional system burners can be added to provide a faster warm up from a cold start, or provide more rapid changes from one operating temperature to another. In normal continuous operation, the afterburner consumes hydrogen, carbon monoxide and any hydrocarbon fuel not consumed by the fuel cell. In the current embodiment, during heat up, standby and normal operation, the mixture fed through the afterburner (12) is the exhaust from the fuel cell stacks. When the fuel processor (42) and stack are in a temperature range when fuel reforming is possible, such as in normal operation, hydrogen and carbon monoxide are the major fuel species found in the fuel (anode exhaust to afterburner) together with a small amount of raw fuel such as methane. The burner (14) may be optimised for this mixture, while still being able to burn natural gas (or other raw fuel) and air mixtures during a cold start.

As a by-product of the electrochemical reaction to generate electricity in the fuel cells, hydrogen and carbon monoxide formed in the fuel processor (42) are converted to water and $CO_2$. The water is in vapour form as it exhausts from the fuel cell stack due to the high temperature and passes through the afterburner (12) as superheated steam. In the afterburner (12), substantially complete oxidation of all fuel species occurs, resulting in a high temperature exhaust stream only containing water vapour, carbon dioxide and nitrogen, and usually excess oxygen. The afterburner feed gas (anode and cathode stack exhausts combined) is preferably fuel lean to stoichiometric to reduce the possibility of unoxidized fuel leaving the system. Typical air stoichiometries for the combustion reaction in the afterburner are about 1.0 to about 3.0. After combustion, the afterburner combustion products are exposed to the high temperature heat exchanger (24) in the integrated module (10), and the low temperature heat exchanger located outside integrated module, where the combustion products give up a substantial portion of their heat to the incoming fuel and air flows, and then is exhausted to the atmosphere or another heat recovery system. As for the fuel stream, water is injected in a preheated hydrocarbon fuel gas prior to it entering into the preformer (42) through the fuel/water inlet (46). In another embodiment, air or oxygen can also be added to the hydrocarbon/water mixture passing through the fuel processor portion of the integrated module (10) to realize autothermal reforming through partial oxidation of the hydrocarbon within the fuel processor. When in the fuel processor (42), the hydrocarbon fuel/water mixture reacts, converting the incoming gases to a hydrogen and carbon monoxide rich stream when heat is supplied from the afterburner (20). Normally this is done with a steam to carbon ratio of 1.3:1 to 3.0:1.0 to ensure that solid carbon is not formed when the hydrocarbon/water mixture is heated. After conversion by steam reforming, the hot gas composition is generally dictated by the gas temperature and related thermodynamic gas equilibrium.

If pure hydrogen is available as a fuel, instead of a hydrocarbon, the fuel processor may be converted to a hydrogen pre-heater by simply removing the catalyst. In such hydrogen systems, the requirement for water, or air, to be added to the fuel stream is unlikely, but will not necessarily have to be removed.

As will be apparent to those skilled in the art, various modifications, adaptations and variations of the foregoing specific disclosure can be made without departing from the scope of the invention claimed herein.

What is claimed is:

1. A SOFC system including a fuel cell having a fuel intake, an air intake, a cathode exhaust and an anode exhaust, and comprising an integrated module comprising an afterburner, a fuel processor and a heat exchanger, wherein:
   (a) said afterburner comprises an intake connected to the anode exhaust and an igniter;
   (b) said heat exchanger comprises an intake connected to an air supply and an exhaust connected to the air intake of the SOFC wherein the heat exchanger is thermally coupled to the afterburner;
   (c) said fuel processor comprises an intake connected to a fuel supply, a fuel reforming catalyst, and an exhaust connected to the fuel intake of the SOFC wherein the fuel processor is thermally coupled to the heat exchanger and/or the afterburner; and
   (d) said integrated module comprises a discrete housing, separate from the fuel cell, which wholly contains the afterburner, heat exchanger and fuel processor.

2. The SOFC system of claim 1 wherein the module comprises three concentric stages, wherein the afterburner comprises a central elongate, substantially cylindrical tube, the heat exchanger surrounds the afterburner, and the fuel processor surrounds the heat exchanger.

3. The SOFC system of claim 2 further comprising a baffle within the heat exchanger for routing air along an indirect path from the heat exchanger intake to the heat exchanger exhaust.

4. The SOFC system of claim 3 wherein said baffle comprises an inclined plane which encircles the afterburner.

5. The SOFC system of claim 2 further comprising heat fins projecting from the heat exchanger into the fuel processor.

6. The SOFC system of claim 1 further comprising a low temperature heat exchanger which accepts the exhaust of the afterburner to preheat air and/or fuel entering the integrated module.

7. An integrated module for use with a SOFC having an intake fuel stream, an intake air stream, a cathode exhaust stream and an anode exhaust stream, said module comprising:
   (a) an inlet for accepting the anode exhaust stream or anode and cathode exhaust streams from the SOFC;
   (b) a combustion chamber in fluid communication with the exhaust stream inlet comprising an igniter and an exhaust;
   (c) a heat exchanger associated with the combustion chamber for transferring heat from the combustion chamber to the intake air stream of the SOFC;
   (d) a fuel processor associated with the combustion chamber and/or heat exchanger comprising a source of water or steam and a reforming catalyst wherein the intake fuel stream is combined with water or steam then heated and passed over the catalyst within the fuel processor to enrich the fuel in hydrogen prior to entering the SOFC; and
in which the combustion chamber, fuel processor and heat exchanger are wholly contained within a discrete housing separate from the SOFC.

8. The integrated module of claim 7 wherein the combustion chamber is an elongate cylinder and the heat exchanger concentrically encircles the combustion chamber.

9. The integrated module of claim 8 wherein the fuel processor concentrically encircles the heat exchanger.

10. The integrated module of claim 9 wherein the fuel processor comprises a plurality of heat fins projecting from the heat exchanger into the fuel processor and a perforated baffle block for retaining the catalyst while permitting fluid flow through the fuel processor.

11. A SOFC system including a fuel cell having a fuel intake, an air intake, a cathode exhaust and an anode exhaust, and comprising an integrated module comprising an afterburner, a fuel processor and a heat exchanger, wherein:
   (a) said afterburner comprises a central elongate, substantially cylindrical tube, an intake at one end of the tube connected to the anode exhaust and an igniter;
   (b) said heat exchanger surrounds the afterburner and comprises an intake connected to the air supply and an exhaust connected to the air intake of the SOFC; and
   (c) said fuel processor surrounds the heat exchanger and comprises an intake connected to the fuel supply, a fuel reforming catalyst, and an exhaust connected to the fuel intake of the SOFC.

* * * * *